United States Patent [19]

Asada et al.

[11] Patent Number: 5,327,399
[45] Date of Patent: Jul. 5, 1994

[54] MULTIVIBRATOR WAVEFORM MONITORING SYSTEM

[75] Inventors: Masaaki Asada, Tokyo; Kazuo Nakai, Kawasaki, both of Japan

[73] Assignee: Japex Geoscience Institute, Inc., Tokyo, Japan

[21] Appl. No.: 795,191

[22] Filed: Nov. 19, 1991

[30] Foreign Application Priority Data

Nov. 22, 1990 [JP] Japan .................................. 2-318278

[51] Int. Cl.$^5$ .......................................... H04R 23/00
[52] U.S. Cl. ..................................... 367/190; 367/38; 181/121
[58] Field of Search .......................... 367/190, 38, 48; 181/111, 112, 113, 121

[56] References Cited

U.S. PATENT DOCUMENTS

| | | | |
|---|---|---|---|
| 4,715,020 | 12/1987 | Landrum, Jr. | 367/38 |
| 4,782,446 | 11/1988 | Ehler et al. | 367/190 |
| 4,800,538 | 1/1989 | Passmore et al. | 367/55 |
| 5,134,590 | 7/1992 | Garotta | 367/38 |

OTHER PUBLICATIONS

Proceedings of the IEEE, vol. 72, No. 10, Oct. 1984, pp. 1290–1301, "Vibrator Signals".
Catalogue: Pelton Company, Inc. Sep. 15, 1987.
Research of Structure of Deep Underground for Precisely Anticipation of Vibrations, Feb. 1989, pp. 17–36: Nature Disaster Science . . . Research.

*Primary Examiner*—J. Woodrow Eldred
*Attorney, Agent, or Firm*—Ladas & Parry

[57] ABSTRACT

A multivibrator waveform monitoring system uses a plurality of seismic energy sources for giving vibrations to strata and a prospector, connected to a geophone, for measuring reflected vibrations. Each of the plurality of seismic energy sources includes a vibrator, a communication unit and a control unit for controlling the starting of the vibrator based on phase difference cancellation information and an operation starting instruction from the prospector. The prospector includes a communication unit and a synchronization control unit for controlling the synchronization of each of the seismic energy sources. The synchronization control unit receives detected information relating to the vibrations of the vibrator by the communication unit, compares a phase difference of vibrations between a master unit which is one of the seismic energy sources and each of slave units which are the rest of the seismic energy sources, calculates phase difference cancellation information for cancelling each phase difference, and transmits the phase difference cancellation information and an operation starting instruction for starting the vibrator by the communication unit. A timing for starting the vibrators of the vibrator for each seismic energy source is adjusted based on the phase difference cancellation information, to thereby make the phase of vibrations of the vibrator of each of the slave seismic energy sources to be the same as the phase of vibrations of the master unit.

2 Claims, 10 Drawing Sheets

MULTIVIBRATOR WAVEFORM MONITORING SYSTEM

BACKGROUND OF THE INVENTION

The present invention relates to a multivibrator waveform monitoring system, and, more particularly, to a multivibrator waveform monitoring system which is used for a geological survey for carrying out a geological survey by giving vibration to a ground surface (strata) by using a plurality of synchronized seismic energy sources and analyzing reflected vibrations from the ground based on the vibrations applied.

In recent years, for carrying out a geological survey such as an oil resource survey or the like within a few kilometer range, a method using oil-pressure control vibrators of seismic energy sources have been widely used to make a non-explosive seismic center, instead of using an artificial seismic prospecting method using dynamites as a seismic center.

One of the seismic energy sources using an oil pressure control type vibrator, VIBROSEIS (a registed trade mark of CONOCO, INC.) is available which was developed by CONOCO, INC. in the USA. Unlike a pulse type seismic energy source for generating vibrations of a single frequency, VIBROSEIS continues to send vibrations (called a sweep) of which oscillation frequency is continuously changed, to underground for a few seconds to several tens of seconds. By sweeping the vibrations, a time of the transmission of vibrations from the seismic center to the point of receiving the vibrations is calculated in the same manner as is done with the radar. Reflected vibrations are received by using a seismometer installed on the ground surface or within a mine. These reflective vibrations are the result of superposition of reflected waves and refracted waves (signal component) from a reflection surface with other vibrations. Therefore, a sweep signal is used as a reference of vibrations to be sent to the underground, and a correlation function is obtained between the seismic waves (reflected vibrations) obtained and the sweep signal, to thereby take out signal components (the reflected waves and the refracted waves) mixed with noise components from the seismic waves.

Figure 9:
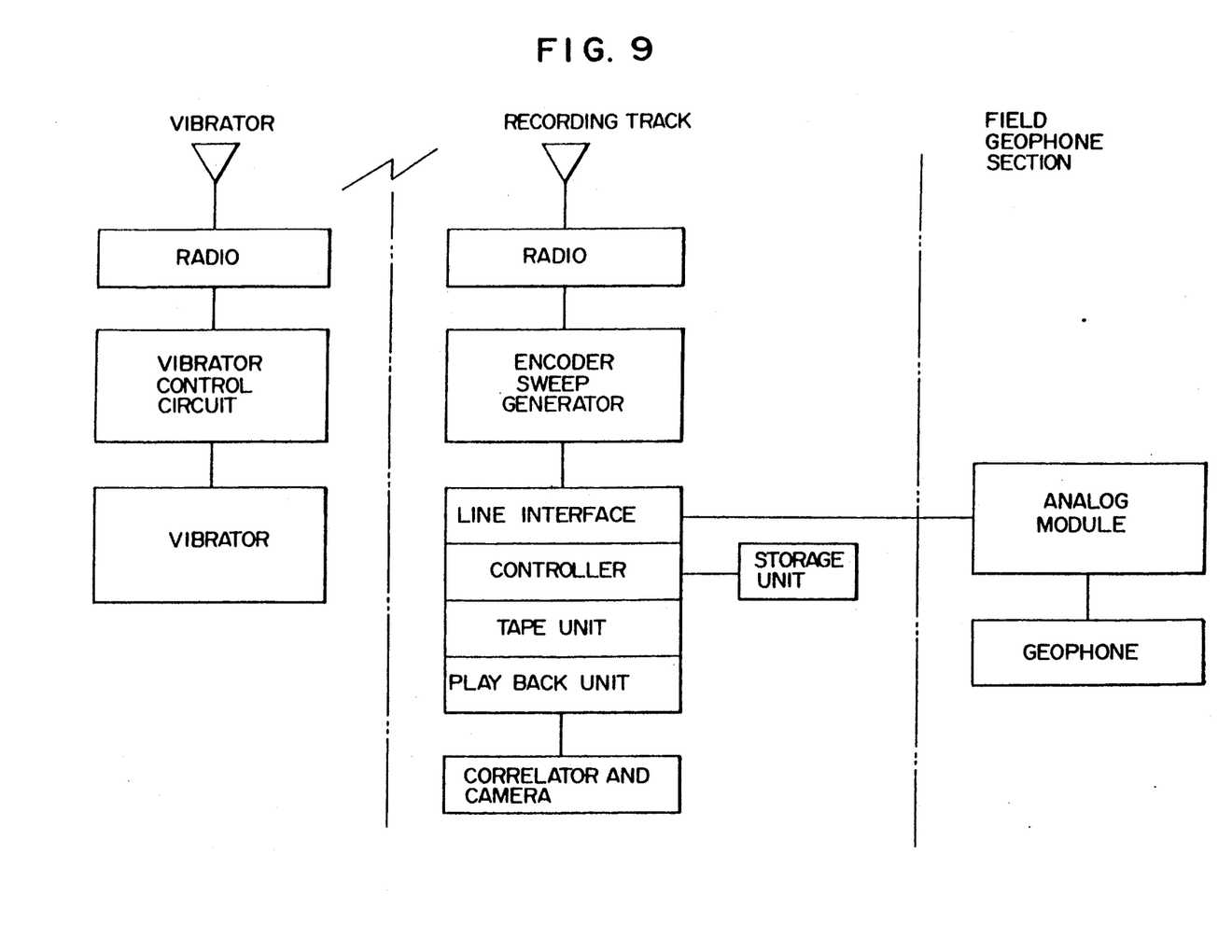
FIG. 9 is a block diagram of the VIBROSEIS system which has been used conventionally.

FIG. 9 shows a block diagram of the structure of the VIBROSEIS system. The system includes a vibrator loaded on a vehicle, a recording truck and field geophones.

The recording truck has an encoder sweep generator, and the vibrator has a vibrator control circuit for storing a reference signal generator for generating a signal similar to that of the encoder sweep generator. The encoder sweep generator of the recording truck transmits a starting signal to the vibrator control circuit through the radio, and the vibrator control circuit starts the sweep reference signal of the generator in response to the starting signal. The waveform of the sweep signal is set to be in the same phase so that of the waveform of the encoder sweep of the recording track as described in detail later. The vibrator control circuit drives the vibrator by using the sweep waveform as a reference signal.

The waveform of the sweep signal of the encoder sweep generator is stored in the storage unit, and the reflected vibration received by the field geophone section is A/D converted by the analog module and the result is stored as digital data in the storage unit. As described above, a correlation function is obtained from the sweep signal stored in the storage unit and the data obtained from the field geophone, so that the reflected waves are calculated.

Figure 10:
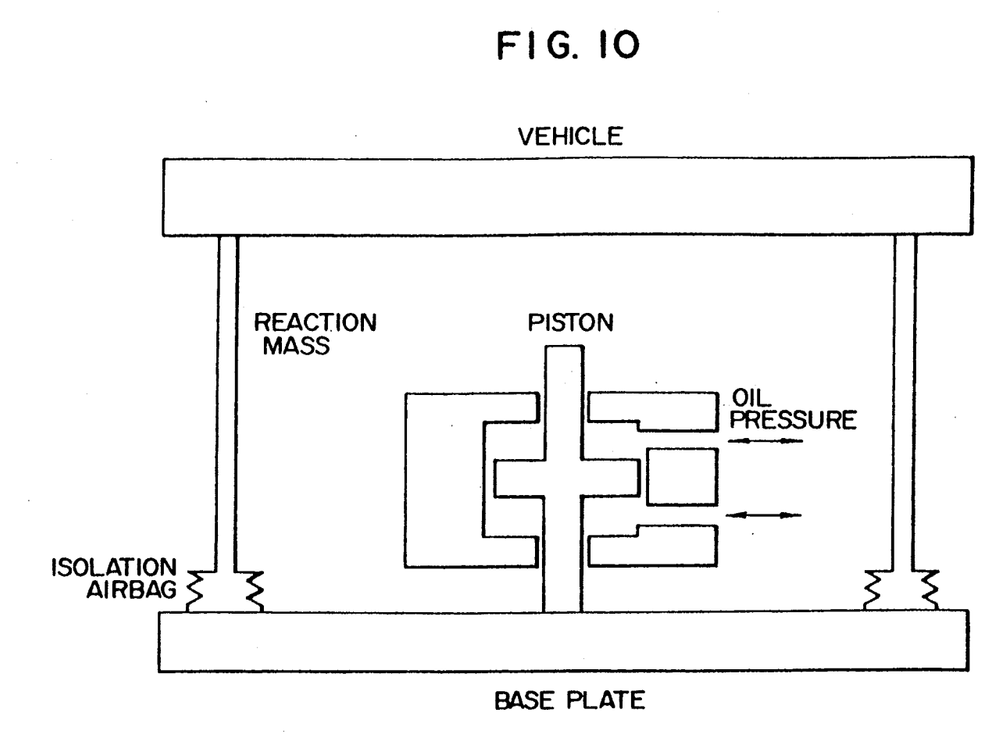
FIG. 10 is a block diagram for showing the outline of the vibrator of system shown in FIG. 9.

FIG. 10 shows a conceptional diagram of the vibrator of this system. The vibrator is loaded on a vehicle so that the vibrator can be moved. The portion of the plate which is in direct contact with the ground surface is called a base plate, which is pressed against the ground surface by the vehicle through an isolation bag. A piston directly connected to the base plate pierces through a cylinder called a reaction mass to alternately increase the oil pressure at arrowed portions in the diagram, to thereby generate vibrations.

Figure 11:
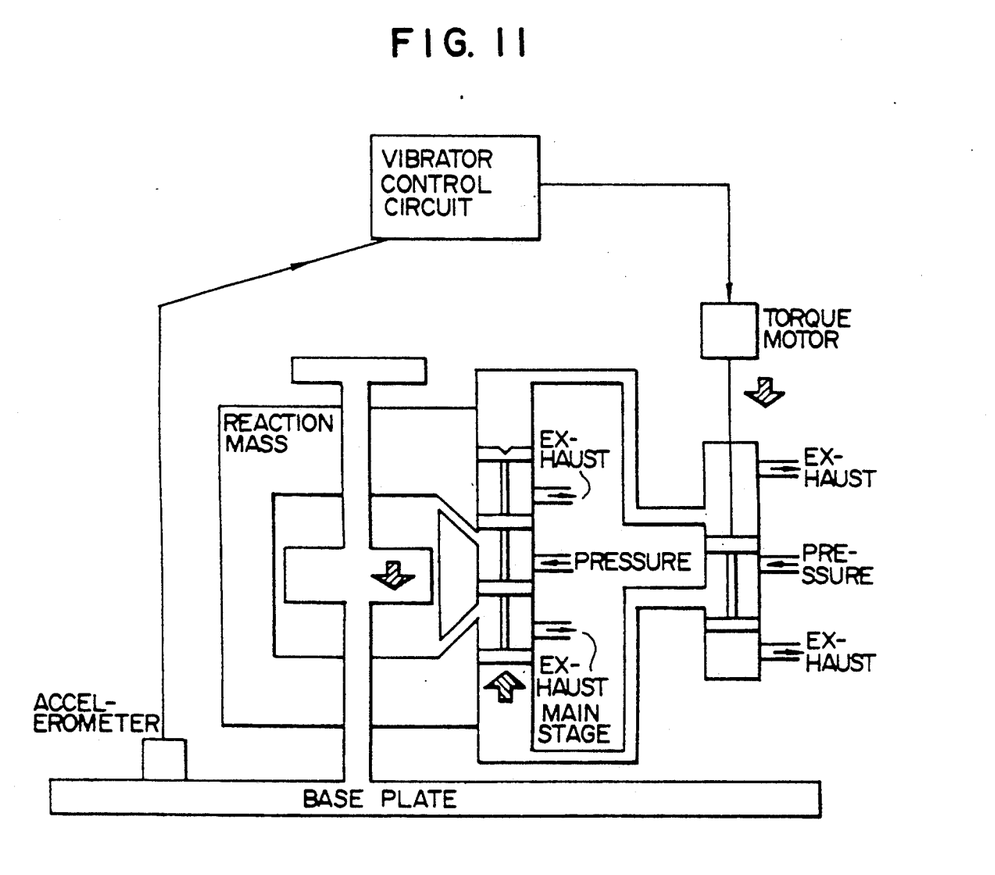
FIG. 11 is a block diagram of the oil pressure control of the vibrator shown in FIG. 10.

FIG. 11 shows a conceptional diagram of the oil pressure control of the vibrator. The oil pressure mechanism is a two-stage amplification type as follows. The vibrator control circuit explained in relation to FIG. 5 controls the current of a torque motor based on the sweep signal of the reference signal generator, to operate a first piston called a pilot stage, with a result that a second piston called a main stage is operated, to apply an oil pressure to the cylinder within the reaction mass. The cylinder is moved vertically to vibrate the base plate.

The vibrator is phase controlled as follows. As described above, the vibrator generates vibrations (sweep) by changing the oscillation frequency in accordance with the sweep reference signal of the reference signal generator. Since the vibrator is driven by a mechanical structure using oil pressure, a phase difference is generated between the vibrations and the reference signal when the oil pressure unit is directly controlled with the sweep reference signal. Further, a resonance frequency which depends on the weight of the base plate and the Poisson's ratio, etc. exists on the ground surface. Accordingly, the resonance frequency is different depending on the place where the vibrator is installed, and the phase deviation attributable to this difference is also applied. To eliminate the above deviations, an accelerometer is provided on the base plate to detect the vibrations of the base plate. This signal is fed back to the reference signal, to thereby compensate the phase difference between the reference signal and the vibrator vibrations. The reference signal applied with this feedback is used to control the vibrations of the vibrator.

According to the geological survey based on the seismic energy source using the above-described vibrator, vibration energy per one unit seismic energy source applied to the ground surface is small unlike the energy applied in the geological survey using an explosive. Therefore, in the geological survey of deep layer portions requiring large energy, a plurality of seismic energy sources are operated simultaneously.

When a plurality of seismic energy sources are to be used, it is required to vibrate these seismic energy sources accurately in the same phase in order to increase the accuracy of the measurement. In the VIBROSEIS system, the waveform of the sweep signal of the reference signal generator of the vibrator control circuit for each seismic energy source is started at the same time by the starting signal (operation starting instruction) from the recording car so that sweep waveforms of the same phase are generated by all the generators, as described above. With the above arrangement, the vibrators of all the seismic energy sources are designed to be operated to generate vibrations in the same phase.

However, the above system is of the so-called independent synchronization type, which makes it difficult to synchronize all the vibrators accurately. As a result, phase differences occur in the vibrations of the vibrators. Therefore, it has been difficult to carry out a geological survey very accurately because of the mutual interference of vibrations. Particularly, it is not possible to curry out the feedback between the seismic energy sources, thus causing a problem that the phase differences become larger as the time passes since the start of the measurement, even if the phase differences are small at the start.

A similarity test is carried out when it is necessary to confirm that the sweep generated by the vibrator is in synchronism with the reference signal. This test is carried out for each seismic energy source by sending back a signal of the accelerometer, fitted to the vibrator before or after of a measurement, to the recording truck by the radio or a cable system, and comparing the sent-back signal with a signal generated by the encoder sweep generator of the recording truck. With this test, it is only confirmed, before or after the measurement, that the a deviation of synchronization is within a permissible range or not. Therefore, it is not possible to confirm whether the signals are being correctly synchronized or not during the measuring period, so that it is difficult to decide whether the data collected are correct or not. Therefore, even if the phase of the vibrations of a certain unit (source) deviates to a large extent from the phase of the variations of other units, the measuring is continued as it is.

According to this system, a signal of the encoder sweep generator is stored in the recording truck, and a correlation function is obtained between this stored signal and a reflected seismic signal obtained, to thereby take out the original signal components (reflected wave and refracted wave) for carrying out an analysis of geology, as described above. However, as the phase difference exists between the signal of the encoder sweep generator and the vibration of the seismic energy source, it is not possible to take out the original signal components accurately by obtaining a correlation function. From this aspect as well, it has been difficult to carry out an accurate measurement.

SUMMARY OF THE INVENTION

It is an object of the present invention to eliminate the above-described problems to make it possible to sweep accurately, in the same phase, vibrations of the vibrators of each seismic energy source in a geological survey using a plurality of seismic energy sources.

It is another object of the present invention to eliminate mutual interference of vibrations of the seismic energy sources to ensure a high-precision survey of a geological structure.

It is still another object of the present invention to eliminate attenuation due to an interruption of vibrations to ensure a highly efficient transmission of vibration energy of the vibrators to the ground so as to save energy.

It is still another object of the present invention to increase transmission efficiency of the vibrators for applying larger vibration energy to the ground, to thereby increase the measurement accuracy.

In order to achieve the above objects, the multivibrator waveform monitoring system for the geological survey according to the present invention includes a plurality of seismic energy sources for applying vibrations to strata, and a prospector connected to a geophone for measuring reflected vibrations. Each of the seismic energy sources includes a vibrator, a communication unit for carrying out communications with the prospector, a detector for detecting vibrations of the vibrator, and a control unit for controlling the starting of the vibrator based on phase difference cancellation information and an operation starting instruction from the prospector. The prospector includes a communication unit for communicating with the seismic energy source and a synchronization control unit for controlling the synchronization of seismic energy source. The synchronization control unit receives through the communication unit information relating to the vibrations of the vibrator detected by the detector of the seismic energy source, compares each difference of phases of vibrations between one of the plurality of seismic energy sources as a main unit (seismic energy source) and the rest of the units as slave units (seismic energy source), calculates a phase difference of each of the seismic energy sources to cancel each of these phase differences, and transmits the phase difference cancellation information and operation starting instruction for starting the vibrator by the communication unit. Based on the phase difference cancellation information, each of the seismic energy sources adjusts the time for starting the vibrator so as to make the phases of the vibrations of the vibrators of the slave seismic energy sources coincide with the phase of the vibrations of the vibrator of the master seismic energy source.

Furthermore, the multivibrator waveform monitoring system according to the present invention uses a plurality of seismic energy sources for applying vibrations to the strata and a prospector connected to a geophone for measuring reflected vibrations. Each of the seismic energy sources includes a communication unit for carrying out communications with the prospector, a vibrator for generating vibrations by changing an oscillation frequency with a signal from the control unit, a detector for detecting vibrations of the vibrator, a reference signal generator for generating a sweep reference signal which becomes the reference of the vibrations of the vibrator, and a control unit for vibrating the vibrator with a phase which is approximate to the sweep reference signal by using a signal that is the sweep reference signal added by the feedback of the signal from the detector. The prospector includes a communication unit for carrying out communications with the seismic energy sources, and a synchronization control unit for controlling the synchronization of the seismic energy sources. The synchronization control unit receives through the communication unit information relating to the vibrations of the vibrator detected by the detector of the seismic energy source, calculates each difference of phases of variations between one of the plurality of seismic energy sources as a main unit and the rest of the units as slave units, and transmits the calculated phase differences to the slave units by the communication unit. Each of the slave seismic energy sources feeds back the phase difference to the reference signal generator so as to make the phase of the vibrations of the vibrator of the slave unit coincides with the phase of the vibrations of the vibrator of the main unit.

Furthermore, the multivibrator waveform monitoring system according to the present invention uses a plurality of seismic energy sources for applying vibrations to the strata. Each of the seismic energy sources includes a communication unit for transmitting and receiving information for synchronization, a vibrator for generating vibrations by changing an oscillation frequency with a signal from the control unit, a detector for detecting the vibrations of the vibrator, a reference signal generator for generating a sweep reference signal which becomes the reference for the vibrations of the vibrator, and a control unit for vibrating the vibrator with a phase which is approximate to the sweep reference signal by using a signal that is the sweep reference signal added by the feedback of the signal from the detector. With one of the plurality of seismic energy sources as a master unit and the rest of the units as slave units, the control unit of the master unit transmits information relating to the vibrations of the vibrator detected by the detector to the slave units by the communication unit. The control unit of each of the slave units feeds back the information relating to the vibrations of the vibrator detected by the detector of the slave unit and the information relating to the vibrations of the vibrator of the master unit to the reference signal generator so as to synchronize the vibrations of the vibrator of the slave unit with the vibrations of the vibrator of the master unit.

The multivibrator waveform monitoring system for a geological survey according to the present invention uses one of the plurality of seismic energy sources as a master unit and the rest of the units as slave units, compares a phase difference of vibrations between the master unit and each slave unit, and applies information for cancelling the phase difference and an operation starting instruction to each seismic energy source.

Alternately, the multivibrator waveform monitoring system according to the present invention detects vibrations of the master unit through the detector, and transmits information relating to the detected signal to each slave seismic energy source either directly or through the prospector. Each slave feeds back the information relating to the signal of the master unit to the sweep signal of the reference signal generator which becomes the reference of the vibrations of the vibrator so as to make the phase of the vibrations of the slave unit coincide with the phase of the vibrations of the master unit.

Furthermore, the multivibrator waveform monitoring system for a geological survey according to the present invention detects vibrations of the seismic energy sources by the detector and uses this signal to obtain a correlation function between these detected vibrations and the reflected vibrations collected by the geophone, to thereby calculate the reflected wave from the underground reflection surface.

BRIEF DESCRIPTION OF THE DRAWINGS

These and other objects and advantages of the present invention will become apparent by the reference to the following description and accompanying drawings, wherein:

FIGS. 8A and 8B are block diagrams for explaining the outline of the seismic energy source in a third embodiment of the present invention where FIG. 8A shows a master unit and FIG. 8B shows a slave unit;

DESCRIPTION OF THE PREFERRED EMBODIMENTS

The preferred embodiments of the present invention will be explained with reference to the drawings.

The First Embodiment

The mechanical structure and the oil pressure control of the seismic energy source in the first embodiment of the present invention have approximately the same structures as those of the vibrator of the VIBROSEIS system described above. The seismic energy source in the first embodiment uses as its vibrator a Y-900 having an operation frequency range of 5 to 100 Hz manufactured by FAILING in the USA, and has this Y-900 loaded on a BIRDWAGEN MK-2, which is an exclusive car, the vibrator, manufactured by IVI in the U.S.A., so that the vibrator can be moved.

Figure 2:
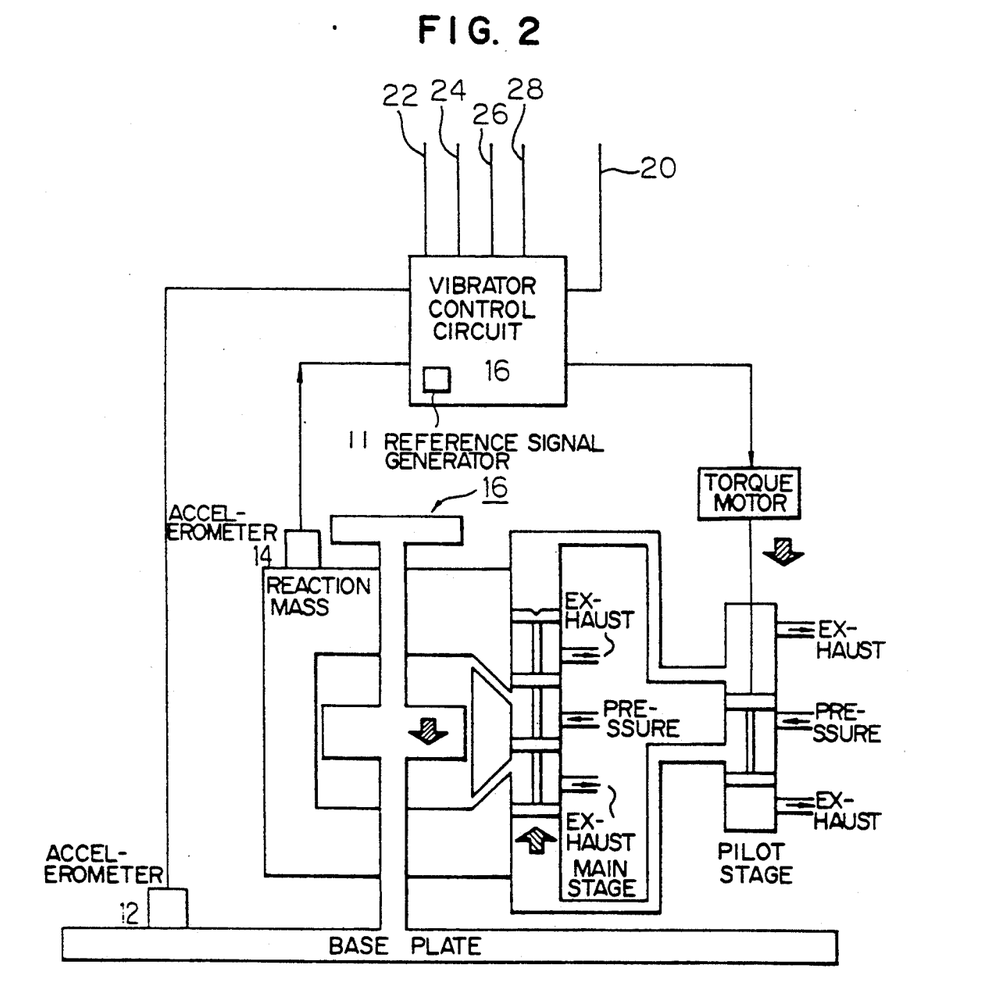
FIG. 2 is a block diagram for showing an outline of the structure of the seismic energy source shown in FIG. 1.

The seismic energy source of the present embodiment has an accelerometer 12 on the base plate as well as another accelerometer 14 on the reaction mass, to work as detectors for detecting vibrations, as shown in FIG. 2. By either selectively using one of the accelerometers on the base plate and the reaction mass or using both accelerometers by applying a suitable combination of weighting to signals of both accelerometers, vibrations which are close to the actual vibrations in the ground are extracted to have an increased accuracy of the survey.

This seismic energy source has a vibrator control circuit 16 for generating vibrations to the vibrator, and the control circuit 16 includes a reference signal generator 11 for generating a sweep signal (a reference signal) which becomes the reference for the vibrations. Signals of the vibration detectors (the accelerometers 12 and 14) of the vibrator are fed back to the sweep signal, and the resultant signal is used as a driving signal for driving the vibrator. The structures and the oil pressure control of this feedback and the vibrator are similar to those of the conventional type described above, and therefore are not explained here.

Figure 1:
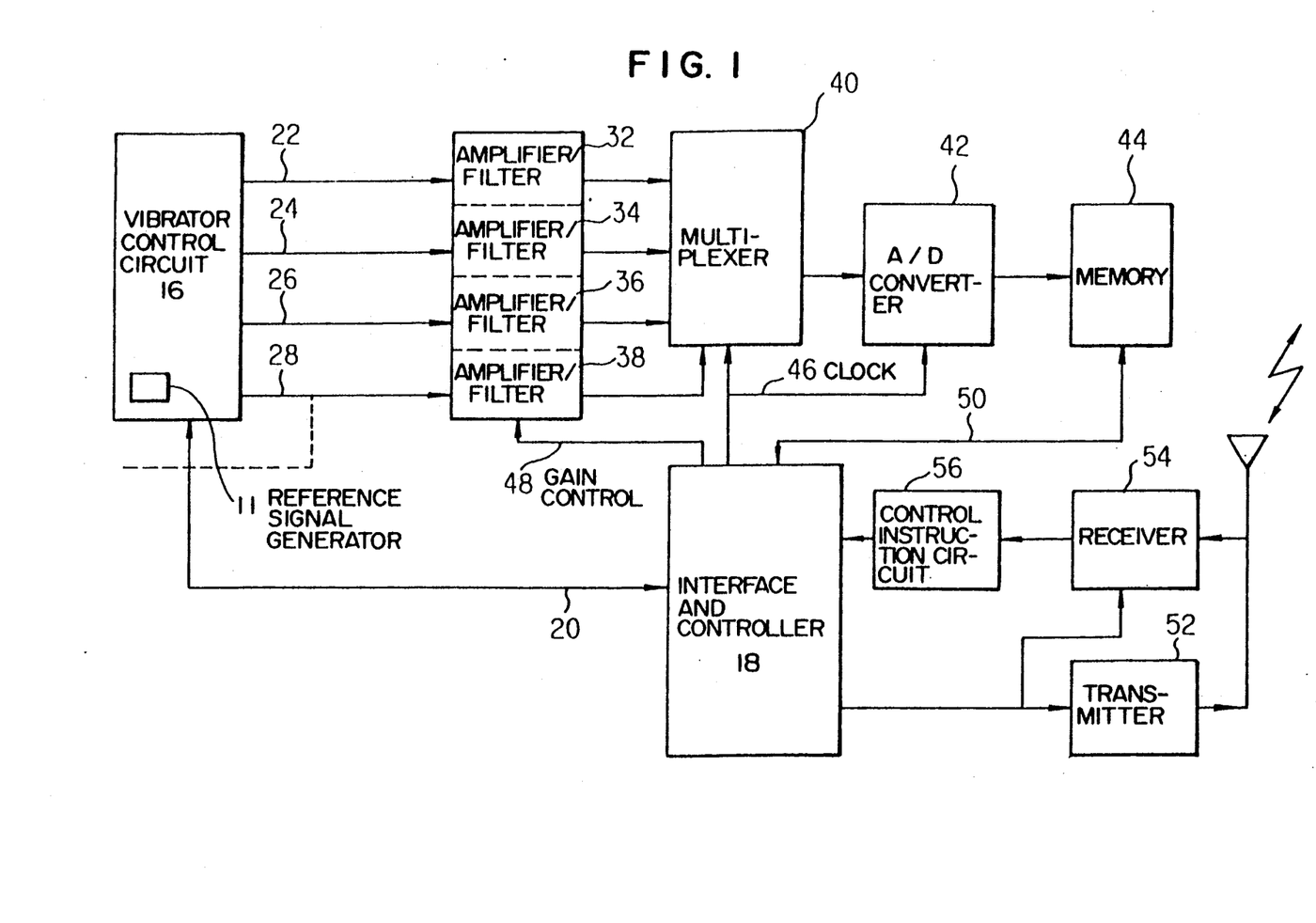
FIG. 1 is a block diagram of the control section of the seismic energy source to be used in the geological survey system in a first embodiment of the present invention.

FIG. 1 shows a block diagram of the control section of the seismic energy source according to the present embodiment. The control section includes a transmitter 52 for transmitting a signal to the prospector, a receiver 54 for receiving a signal from the prospector, a control instruction detector 56 for detecting a control signal that has been received by the receiver, an interface and controller 18 for taking an interface and controlling a signal, amplifiers and filters 32 to 38 for receiving a signal from the vibrator through the vibrator control circuit 16, a multiplexer 40 for outputting signals from the amplifiers and filters in a constant routine, an A/D converter 42 for converting an analog output from the multiplexer into a digital signal, and a memory 44 for holding a signal from the A/D converter.

When the prospector has issued a control signal including an operation starting instruction of the seismic energy source, the seismic energy source receives this signal through the receiver 54, detects the operation starting instruction through the control instruction detector 56, and input the signal and the instruction to the vibrator control circuit 16 through the interface and controller, so that the reference signal generator 11 generates a reference signal, based on which the vibrator starts vibrations. The vibrator sweeps for a period of several tens of seconds by changing the frequency, and then becomes in a waiting state to wait for a next operation starting instruction.

The reference signal for driving the vibrator is also inputted to the amplifier and filter 32 through a line 22. When the vibrator has started vibrations, the accelerometer 12 fitted to the base plate (refer to FIG. 2) generates a voltage signal corresponding to the vibrations of the base plate, and this signal is inputted to the amplifier and filter 34 through a line 24. Similarly, a voltage signal corresponding to the vibrations of the reaction mass of the accelerometer 14 fitted to the reaction mass (refer to FIG. 2) is inputted to the amplifier and filter 36 through a line 26. A line 28 and the amplifier and filter 38 are spare channels for a new accelerometer to be fitted. The above signal is amplified in the amplifiers and filters 32, 34 and 36, and unnecessary noise components are eliminated. The resultant signal is then inputted to the multiplexer 40. The signal inputted to the multiplexer is added to the A/D converter in a predetermined routine, converted into a digital signal and then is outputted to the memory 44. The memory 44 has a two-divided structure to make it possible to carry out simultaneous reading and writing. The memory writes a digital signal which has been inputted and reads data in a time-compressed form to transfer the data by a time division system to be described later. The data is transferred to the prospector through the transmitter 52 through the interface and controller 18.

On the other hand, a control signal from the prospector is received by the receiver 54, and an operation starting instruction of the vibrator and the like included in this signal are detected by the control instruction detector, as described before. The control signal includes phase difference cancellation information, a data transfer instruction for the seismic energy source and a preamplifier gain control signal, in addition to the operation starting instruction. The interface and controller off-set the timing of starting the vibrator with the phase difference cancellation information. In other words, the interface and controller starts the vibrator after a delay of a predetermined time period since the operation starting instruction has been inputted. The delay time is set to be either longer or shorter according to the phase difference cancellation information. This control will be explained in detail later. The interface and controller further transfers the data stored in the memory 44 based on the data transfer instruction, and controls the gains of the amplifiers 32 to 38 based on the preamplifier gain control signal.

Figure 3:
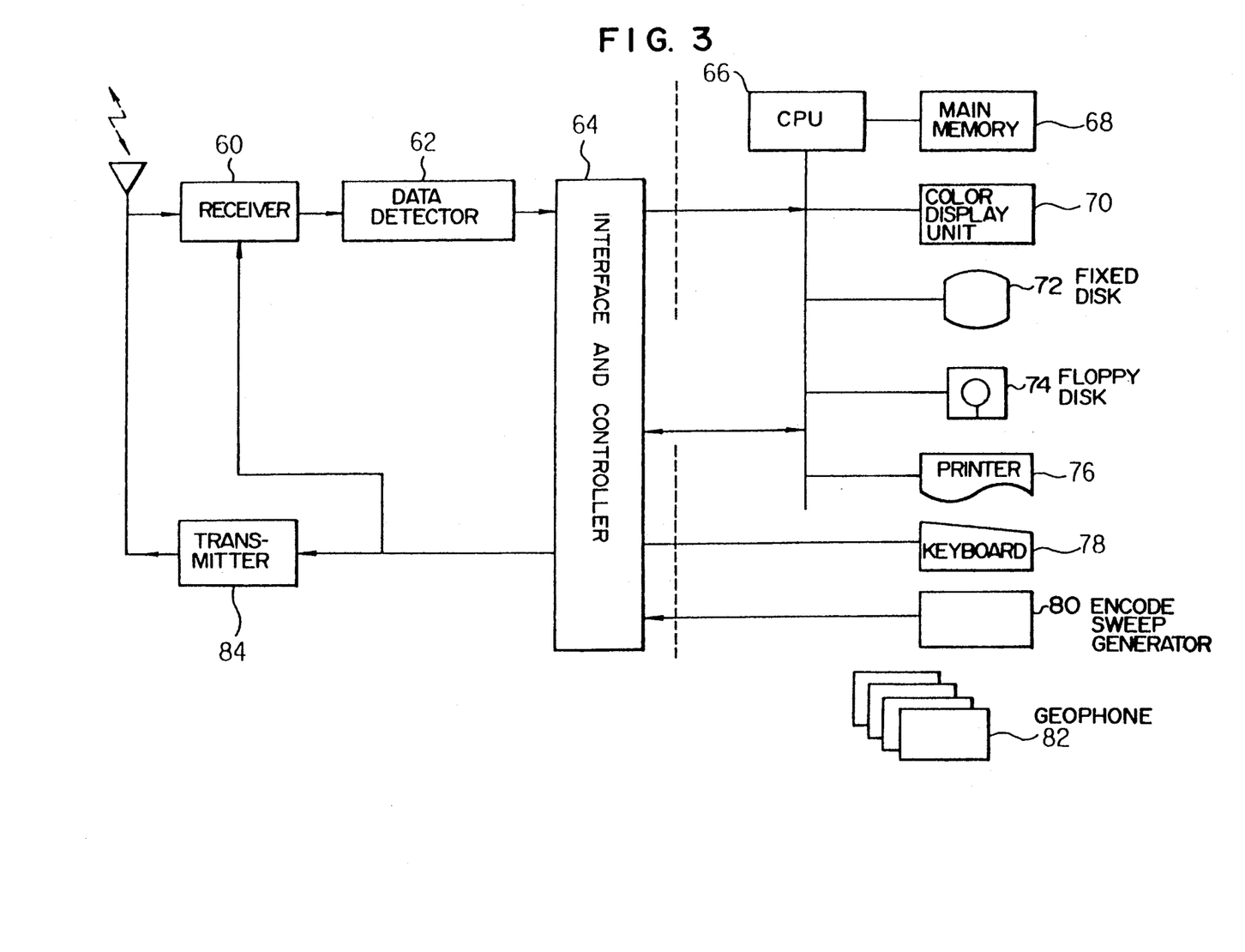
FIG. 3 is a block diagram of the control section of the prospector for the multivibrator waveform monitoring system in the first embodiment of the present invention.

The control operation of the prospector in the present embodiment will be explained next with the reference to the block diagram shown in FIG. 3.

An interface and controller 64 is connected to an encoder sweep generator 80 for generating a reference signal, a keyboard 78 for inputting a control instruction, a printer 76 for outputting information relating to this unit, a floppy disk drive 74 for storing information, a fixed disk 72, a color display unit 70 for displaying monitor information, and a CPU 66 for carrying out the control of these peripheral units and information processing. Furthermore, the prospector is connected with a plurality of geophones 82 for receiving reflected seismic signals.

When an operation starting instruction has been inputted from the keyboard 78, the interface and controller 64 transmits the operation starting instruction for starting the vibrator through the transmitter 84, and transmits a data transfer instruction subsequently. A data signal sent from each of the seismic energy sources in response to the data transfer instruction is received by a receiver 60 and the data is detected by a data detector 62. The data is then inputted to the CPU 66 through the interface and controller 64.

Figure 4:
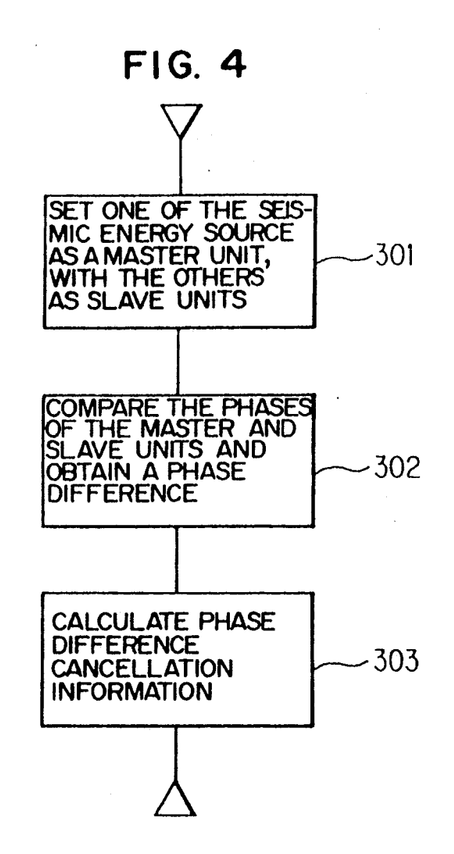
FIG. 4 is a flow chart for explaining the processing for calculating a phase difference cancellation instruction.

The CPU 66 stores data from the plurality of seismic energy sources in a main memory 68, and carries out the following processing, which will be explained with the reference to the flow chart shown in FIG. 4. First, one of the seismic energy sources is set as a master unit and the other units as slave units (Step 301), then the vibrations (phases) of the master unit and each of the slave units are compared for obtaining a phase difference (Step 302). Based on this phase difference, phase difference cancellation information for offsetting (advancing or delaying) the starting time of the vibrator of each seismic energy source is calculated (Step 303). This phase difference cancellation information is sent from the transmitter 84 to each of the seismic energy sources.

As described above, each seismic energy source starts the vibrator after a predetermined delay time from the operation starting instruction has been inputted, and this delay time is offset based on the phase difference cancellation information. In other words, when the starting of the vibrations of a slave unit is later than the starting of the vibrations of the master unit, the phase difference cancellation information shortens the delay time, and on the other hand when the starting of the vibrations of a slave unit is earlier than the starting of the vibrations of the main unit, the phase difference cancellation information makes the delay time longer.

When the operation starting instruction has been transmitted from the prospector to each of the seismic energy sources, all of the seismic energy sources start vibrations at the same time as their delay times have been offset and the starting times of the vibrators have been adjusted.

In the seismic energy source of the present embodiment, data calculated during the measuring operation can be monitored in real time on the color display unit by the control of the CPU 66. By monitoring the vibration data of each seismic energy source on the color display unit, it is possible to check whether each of the seismic energy sources is vibrating in the same phase. If the synchronization of any one seismic energy source deviates largely, an alarm is given on the color display and is also given with a buzzer so that the collection of inaccurate data can be avoided. In the seismic energy source, it is also possible to print out these monitored and collected data on the printer 76.

In the present embodiment, a delay time of each seismic energy source for the starting of each vibrator is adjusted based on the phase difference cancellation information and all the vibrators of the seismic energy sources are started simultaneously based on the operation starting instructions for standardizing the starting time. Instead of using the phase difference cancellation information, it is also possible to start all the vibrators simultaneously by issuing operation starting instructions of different timings to each of the seismic energy sources, for example.

Second Embodiment

A second embodiment of the present invention will be explained next. While in the first embodiment, vibrations of the vibrators are synchronized by controlling the operation starting time for each seismic energy source, in the second embodiment, vibrations of the vibrators are synchronized by applying a feedback to the reference signal generator of each seismic energy source.

A mechanical structure of the seismic energy source is similar to that explained in relation to FIG. 2, and thererefor this is not explained. Only the control section will be explained with reference to the block diagram shown in FIG. 5. Those materials which are almost the same as these in the first embodiment are shown by applying similar identifiable reference numbers in FIG. 5, and a detailed explanation of these materials will be omitted here.

Figure 5:
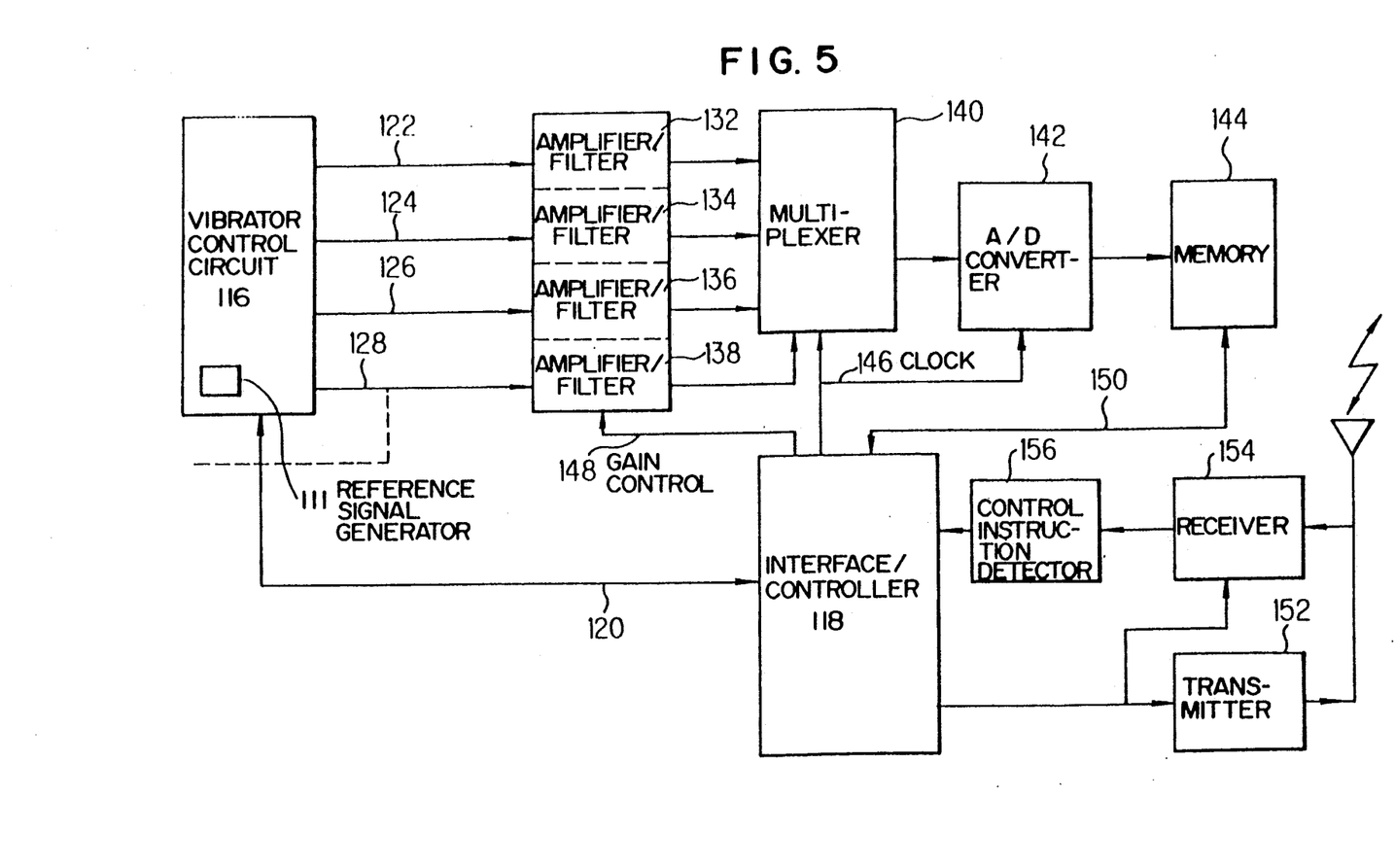
FIG. 5 is a block diagram of the control section of the seismic energy source to be used in the geological survey system in a second embodiment of the present invention.

The control section includes a transmitter 152, a receiver 154, a control instruction detector 156, an interface and controller 118 for taking an interface and carrying out control of a signal, amplifiers and filter 132 to 138, a multiplexer 140, an A/D converter 142, and a memory 144. The interface and controller 118 of the present embodiment applies a feedback to the reference signal generator 111 stored in the vibrator control circuit 116 of the seismic energy source based on a correcting instruction for the reference signal generator sent from a prospector to be described later, and corrects this reference signal to correct the vibration of the vibrator.

When the prospector has issued a control signal including the operation starting instruction for an seismic energy source, the seismic energy source starts vibrations of the vibrator based on this signal. A reference signal for driving the vibrator is applied also to the amplifier and filter 132 through a line 122. When the vibrator has started vibrations, the accelerometer 12 fitted to the base plate (refer to FIG. 2) generates a voltage signal corresponding to the vibrations of the base plate, and this signal is inputted to the amplifier and filter 134 through a line 124. Similarly, a voltage signal corresponding to the vibrations of the reaction mass of the accelerometer 14 fitted to the reaction mass (refer to FIG. 2) is inputted to an amplifier and filter 136 through a line 126.

The above signals are then amplified and unnecessary noise components included in these signals are eliminated by the amplifiers and filters 132, 134 and 136. These signals are then applied to a multiplexer 140. The signals inputted to the multiplexer are added to an A/D converter 142 in a predetermined routine, converted into digital signals and are outputted to a memory 144. The memory 144 writes the inputted digital signals and reads data in a time-compressed form. The data is transferred to the prospector by a transmitter 152 through the interface and controller 118.

On the other hand, the control signal from the prospector in the present embodiment includes a correcting instruction for the reference signal generator, in addition to an operation starting instruction, a data transfer instruction for the seismic energy source and a preamplifier gain control signal which are similar to those in the first embodiment as described above. The interface and controller 118 applies a feedback to the vibrations of the vibrator by correcting the sweep signal of the reference signal generator of the seismic energy source based on the correcting instruction for the reference signal generator as described above, in addition to carrying out the operations similar to those in the first embodiment described above.

Figure 6:
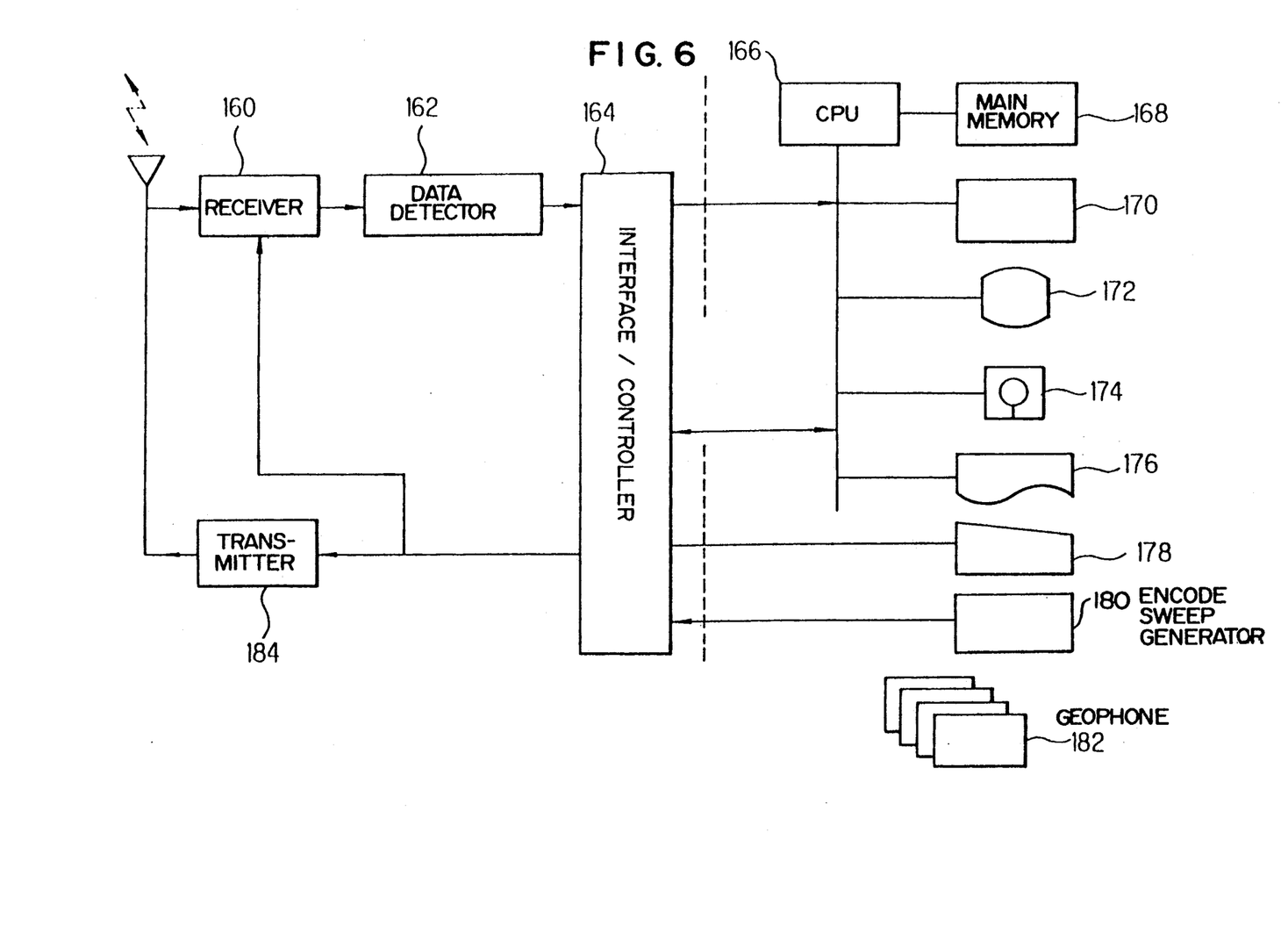
FIG. 6 is a block diagram of the control section of the prospector in the multivibrator waveform monitoring system in the second embodiment of the present invention.

The control operation of the prospector in the present embodiment will be explained with reference to the block diagram in FIG. 6.

An interface and controller 164 is connected to an encoder sweep generator 180, a keyboard 178, a printer 176, a floppy disk drive 174, a magnetic tape unit 172, a color display unit 170 and a CPU 166 for carrying out a control of these peripheral units and an information processing. A plurality of geophones 182 for receiving reflected earthquake is connected to the prospector.

When an operation starting instruction has been inputted from the keyboard 176, the interface and controller 164 transmits an operation starting instruction for the vibrator through a transmitter 184 and then transmits a data transfer instruction. A data signal from each seismic energy source transmitted in response to the data transfer instruction is received by a receiver 160 and the data is detected by the data detector. The data is inputted to the CPU 166 through the interface and controller 164.

Figure 7:
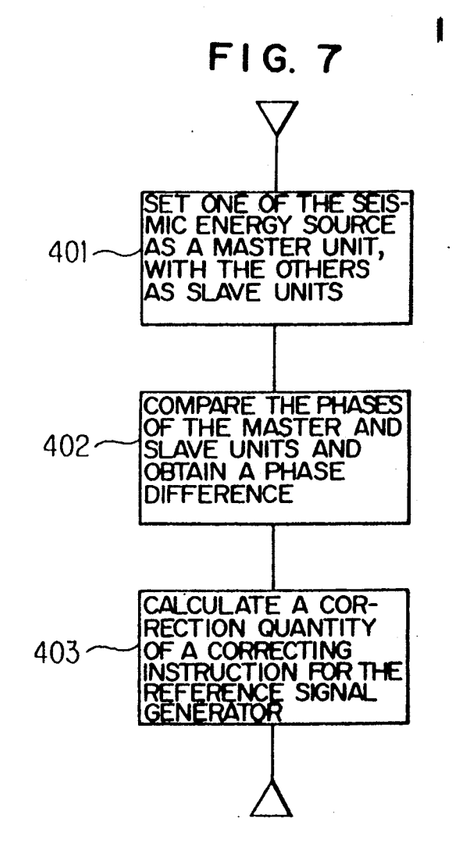
FIG. 7 is a flow chart for explaining the processing for calculating a correction quantity of the reference signal generator.

The CPU 166 stores data from the plurality of seismic energy source in a main memory 168 and carries out the following arithmetic operation, which will be explained with reference to the flow chart shown in FIG. 7. First, one of the seismic energy sourcing units is set as a master unit and the rest of the units as slave units (Step 401), and the variations (phases) of the master unit and each of the slave units are compared to obtain a phase difference (Step 402). Based on this phase difference, a correction quantity for each slave unit is calculated for synchronizing the variations of each slave unit with the variations of the master unit (Step 403). This correction quantity is sent, as a correcting instruction for the reference signal generator, from the transmitter 184 to each slave seismic energy source. A sweep signal of the reference signal generator in each slave unit is corrected based on the correcting instruction. When the speed of the vibration of a slave unit is slower than the speed of the vibrations of the master unit, the phase of the generator is advanced, and when the speed of the vibrations of the slave unit is faster than the speed of the vibrations of the master unit, the phase of the generator is delayed, so that the vibrations of the vibrator of each slave unit are synchronized with the vibrations of the master unit.

Next, a description will be made of a geological survey to the carried out for the purpose of an oil resource survey, a mineral resource survey each as a survey of a deposit, an academic survey, etc. which are based on a geological survey system by using the above-described seismic energy source and the prospector. In the present embodiment, eight seismic energy sources are used, and these units and a recording truck (a prospector) transmit and receive data and control signals based on a time-sharing communication system.

When an operator has instructed a starting of the operation with the keyboard 178, the operation starting instruction is simultaneously sent to the eight seismic energy sources from the recording track. In response to this instruction, all the vibrators of the seismic energy sources start vibrations at the same time. Then, the recording truck sequentially sends data transfer instructions to the eight seismic energy sources. In response to instructions, data signals relating to the vibrations of the vibrators are sequentially transferred from the respective seismic energy sources. The recording track which has received these data signals stores these data signals in the main memory 168 by using the CPU 166, and calculates a correction quantity for each of the seven slave units so that the vibrations of each of the seven slave units are synchronized with the vibrations of one master unit, as described above.

The correction quantities are sequentially sent to the respective slave seismic energy source units from the recording truck as correcting instructions for the reference signal generators. Each of the slave seismic energy sources (units) applies a feedback to the sweep signal of the reference signal generator based on the correcting instruction received, so that each vibrator generates vibrations in the same phase as that of the master unit.

By the vibrations of each vibrator, seismic energy is applied to the ground surface. The energy is transmitted in a vertical direction as a P wave and is then reflected and refracted by a reflection surface or the like. These reflected waves and refracted waves are superposed with other vibrations and are received as reflected seismic signals by the plurality of geophones 182 of the seismic prospector. The received waves are transferred to the prospector and are recorded there as vibration data on a magnetic tape. After completing the field survey work, all of the data are brought to a computer room, where the recorded data are analyzed by using a large computer, to thereby analyze the geological structure. Based on the data analyzed, a potential of oil resources or the like is studied.

In the present embodiment, in order to synchronize the vibrations of the vibrators of the seismic energy sources, phase differences of the vibrations between the master and slave units are calculated by the prospector, and correcting instructions thus obtained are applied to the reference signal generators of the respective slaves as a feedback. This feedback can also be applied by other various methods, such as, for example, the following methods.

(a) Data relating to the vibrations of the master unit is transferred to the slave units through the prospector, and a feedback is applied to the reference signal generator of each slave unit by using the vibrations of the master unit.

(b) Data relating to the vibrations of the seismic energy sources are sent to the prospector, and the prospector obtains phase differences between the data obtained and the data from the encode sweep generator stared in the prospector, and the calculated phase differences are sent back to the respective seismic energy sources and a feedback is applied to each of the reference signal generators by using the data fed back.

(c) A sweep signal from the encode sweep generator of the prospector is sent to each of the seismic energy sources, and a feedback is applied to each of the reference signal generators by using the sweep signal.

(d) It is also possible to send the sweep signal from the encode sweep generator of the prospector to each of the seismic energy source and use this signal, instead of the sweep signal of the reference signal generator, for driving the vibrator.

In the first and second embodiments, description has been made of the case where a plurality of seismic energy sources are synchronized to apply seismic energy to the ground in a vertical direction. However, it is also possible to offset the vibrations of the seismic energy sources by a required quantity by changing the program of the CPU's 66 and 166 of the prospector to thereby deviate the operation starting instruction area or the correcting instruction signal which is issued from this program. With the arrangement, it is also possible to have a directivity of a specific direction in the seismic energy by gradually offsetting (or deviating) the vibrations of a plurality of seismic energy sources disposed linearly, for example.

According to those embodiments, a correlation function is obtained between the reflected seismic signals and vibration data obtained from the seismic energy sources, not the sweep signal of the generator stored in the prospector. Therefore, no phase difference exists between both data, so that reflected waves and refracted waves can be extracted accurately. As the result, the accuracy of a geological survey can be increased. Further, the system can be easily structured by only adding the central unit to the existing vibrator without any mechanical change. There is an advantage that the vibrations of the vibrators can be synchronized in the same phase without providing a particular additional communication unit between the seismic energy sources.

According to this embodiment, it is also possible to check whether the seismic energy sources are generating vibrations in the same phase during a measuring period, because a color display unit is used to monitor vibration data of the seismic energy sources during the measuring operation. Furthermore, when the vibrations by any one of the seismic energy sources has shown a large deviation from the synchronization, this is alarmed on the color display unit and by a buzzer. Thus, it is possible to prevent an unnecessary continuation of the measuring which results in a collection of useless data.

Third Embodiment

A third embodiment of the present invention will be explained below with reference to FIG. 8 which shows an outline of the seismic energy source to be used for a geological survey system. In the above embodiments, description has been made of the case of a seismic energy source which uses a low-frequency type oil-pressure driving system vibrator for carrying out a geological survey in deep strata, requiring large seismic energy. In the third embodiment, description will be made of the case of a seismic energy source which aims at making a geological survey in relatively shallow strata. Large seismic energy is not required to carry out a survey of shallow strata. However, in order to make an accurate survey of the shallow strata, it is necessary to generate vibration by the vibrators in a high frequency. For this purpose, in the third embodiment, electromagnetic vibrators are used and synchronizing signals are mutually transmitted and received by the seismic energy sources so that all the seismic sourcing units are synchronized without intermediate operations of the prospector unlike the above embodiments.

Figure 8A:
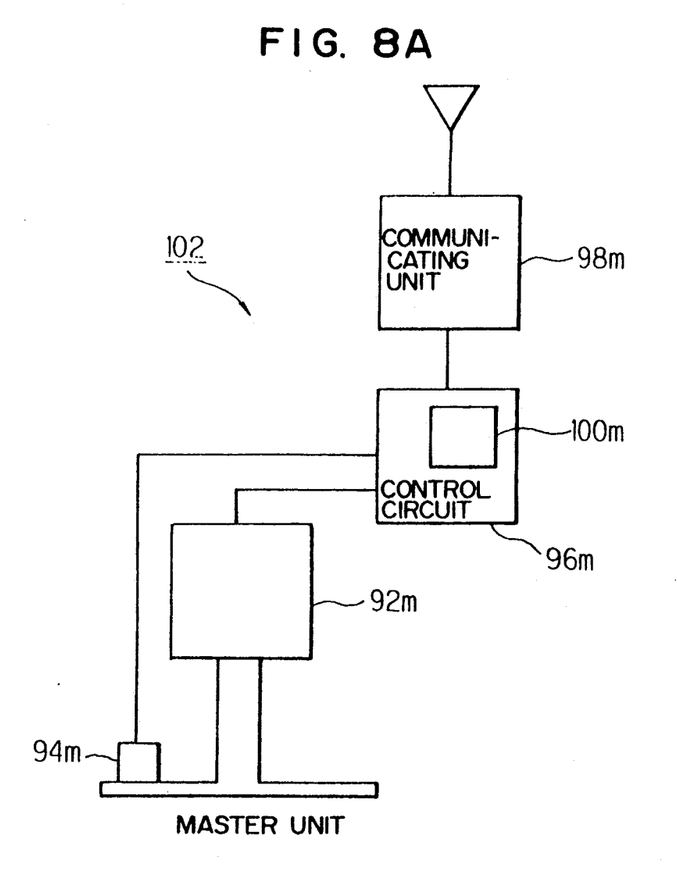
Figure 8B:
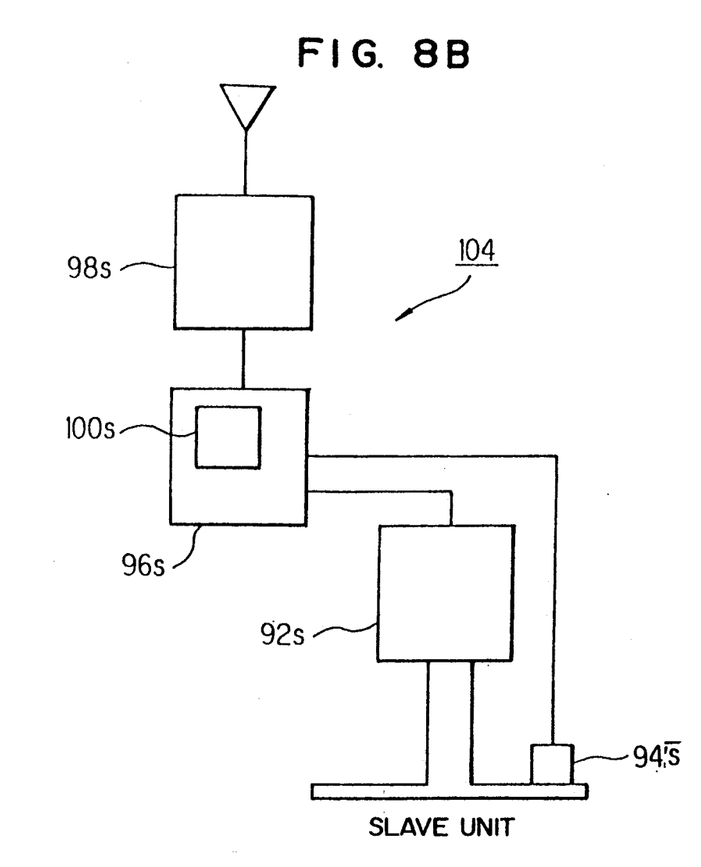

Referring to FIGS. 8A and 8B, a control circuit 96 has a reference signal generator 100 for generating a sweep signal which becomes the reference of the vibrations of the vibrators. Based on this reference signal, the control circuit 96 causes an electromagnetic vibrator 92 to generate vibrations by continuously changing (Sweeping) the oscillation frequency. An accelerometer 94 fitted to this vibrator 92 outputs the vibrations of the vibrator to the control circuit 96. The control circuit feeds back the signal from this accelerometer to the sweep signal of the reference signal generator 100, to thereby synchronize the vibrations of the vibrator with the vibrations of the sweep signal.

The synchronizing system of the present invention will be explained next. One of a plurality of seismic energy sources in the configurations of FIGS. 8A and 8B is assumed as a master unit (FIG. 8A) and the rest of the units as slave units (FIG. 8B). A control circuit 96m of a master unit 102 transmits vibrations of the vibrator from an accelerometer 94m to a slave unit 104 through a communicating unit 98m. The slave unit 104 feeds back this signal to the sweep signal of a reference signal generator 100s by a control circuit 96s, as that the slave unit synchronizes the vibrations of the vibrator with the vibrations of the master unit.

As an alternative system, the following operation is also possible. That is, the vibrations of the vibrator from an accelerometer 94s are transmitted from the slave unit 104 to the master unit 102, and a synchronization error in the vibrations of the vibrator in the slave unit from the vibrations of the vibrator in the master unit is calculated in the control circuit 96m of the master unit. The calculated value is fed back to the reference signal generator 100s so that the vibrations of the vibrator in the slave unit are synchronized with the vibrations of the vibrator in the master unit.

According to the present embodiment, the seismic energy sources can be structured in a relatively lightly. Therefore, the units can be moved by human power to carry out geological surveys in mountainous areas.

The specific embodiments of the present invention have been explained above. It is needless to mention that those who have been skilled in the art of this field can carry out various modifications to the present invention within the spirit and the scope of the present invention.

What is claimed is:

1. A multivibrator waveform monitoring system using a plurality of seismic energy sources for giving vibrations to strata and a prospector, connected to a geophone, for measuring reflected vibrations,
   each of said plurality of seismic energy sources including:
      a time-swept multifrequency vibrator;
      communication means for carrying out communication with said prospector;
      a detector for detecting a vibration frequency of said vibrator; and
      control means for controlling the starting of operation of said vibrator based on phase difference cancellation information and operation starting instruction sent from said prospector,
   said prospector including:
      communication means for carrying out communication with said seismic energy source; and
      synchronization control means for controlling the synchronization of said seismic energy sources, said synchronization control means receiving, by said communication means, information relating to the vibration frequency of said vibrator detected by said detector of each of said seismic energy sources, comparing a phase difference of vibrations between one of said plurality of the seismic energy sources as a master unit and each of the rest of said seismic energy sources as a slave unit, and calculating phase difference cancellation information for cancelling each of the phase differences of said each of said plurality of seismic energy sources, to thereby send said phase difference cancellation information and operation starting instruction for starting the operation of said vibrator by said communication means, and
      means for adjusting a timing of starting the operation of a vibrator in each of said seismic energy sources based on said respective phase difference cancellation information, to make the phase of vibrations of said vibrator of each of said slave seismic energy sources to be the same as the phase of vibrations of said master unit.

2. A multivibrator waveform monitoring system according to claim 1, wherein a correlation function is calculated between information relating to reflected vibrations from strata received by said geophone and information relating to vibrations of said vibrator detected by said detector of each seismic energy source, to thereby calculate a reflected wave from the underground.

* * * * *